United States Patent [19]

Trell

[11] Patent Number: 4,987,589
[45] Date of Patent: Jan. 22, 1991

[54] ENTRANCE TELEPHONE SYSTEM UTILIZING THE PUBLIC SUBSCRIBER TELEPHONE NETWORK

[76] Inventor: Anders E. Trell, Torkel Knutssonsg. 35, Stockholm, Sweden, S-116 51

[21] Appl. No.: 296,393

[22] Filed: Jan. 9, 1989

Related U.S. Application Data

[63] Continuation of Ser. No. 30,865 filed as PCT SE86/00313 on Jun. 26, 1986, published as WO87/00378 on Jan. 15, 1987, abandoned.

[30] Foreign Application Priority Data

Jun. 27, 1985 [SE] Sweden .............................. 8503209

[51] Int. Cl.⁵ ............................................ H04M 11/00
[52] U.S. Cl. ................................................. 379/10.3
[58] Field of Search ....................... 379/40, 42, 43, 44, 379/51, 103, 105, 188, 199, 249

[56] References Cited

U.S. PATENT DOCUMENTS

| 3,917,911 | 11/1975 | Lesher | 379/103 |
| 3,947,641 | 3/1976 | Trell | 379/103 |
| 3,990,075 | 11/1976 | Schmitz et al. | 379/40 X |
| 4,113,986 | 9/1978 | Clement et al. | 379/103 |
| 4,355,207 | 10/1982 | Curtin . | |
| 4,436,958 | 3/1984 | Hansen et al. | 379/103 |
| 4,644,104 | 2/1987 | Middlemiss | 379/103 |

FOREIGN PATENT DOCUMENTS 3344151 3/1972 Sweden .

OTHER PUBLICATIONS

John Gauthier, "New Electronic Enterphone System," GTE Automatic Electric Journal, Jan. 1979, pp. 6-13.

Primary Examiner—Keith E. George
Attorney, Agent, or Firm—Fleit, Jacobson, Cohn, Price, Holman & Stern

[57] ABSTRACT

Entrance telephone installation intended to be connected to a public telephone network, said installation including a number discriminator with line access and dialling facilities, addressable from an entrance telephone set for connection of a circuit to specific reply sets, said reply sets being arranged to facilitate signalling via the circuit switched through in the telephone network to accomplish door lock opening. According to the invention, a specific ID-signal is transmitted to the telephone network during a first predetermined time period after completed switching operation to a specific reply set, with simultaneous monitoring of the telephone network with regard to digits entered from called reply set transferred via the telephone network as a pulsed signal, multi frequency signal or optical signal, absence of such digit entered from the reply set during said first time period resulting in disconnection of the connection. Detection of one or a number of digits entered from the reply set during said first time period being interpretated as specific commands, which are transformed into specific actions, for example establishment of video and/or speech communication with the entrance set, blocking action preventing repeated calls during a predetermined time period, immediate disconnection, alarm transmission from the entrance set or any other predetermined function. The first time period is followed by a second time period, provided that a predetermined digit is entered during the first time period, whereunder video and/or speech communication can take place between the reply set and the entrance set. Digits entered from the reply set during said second time period are detected and interpretated as specific commands, which with regard to resulting function for one or a number of individual signals result in different resulting functions in relation to corresponding signal(s) during the first time period.

12 Claims, 3 Drawing Sheets

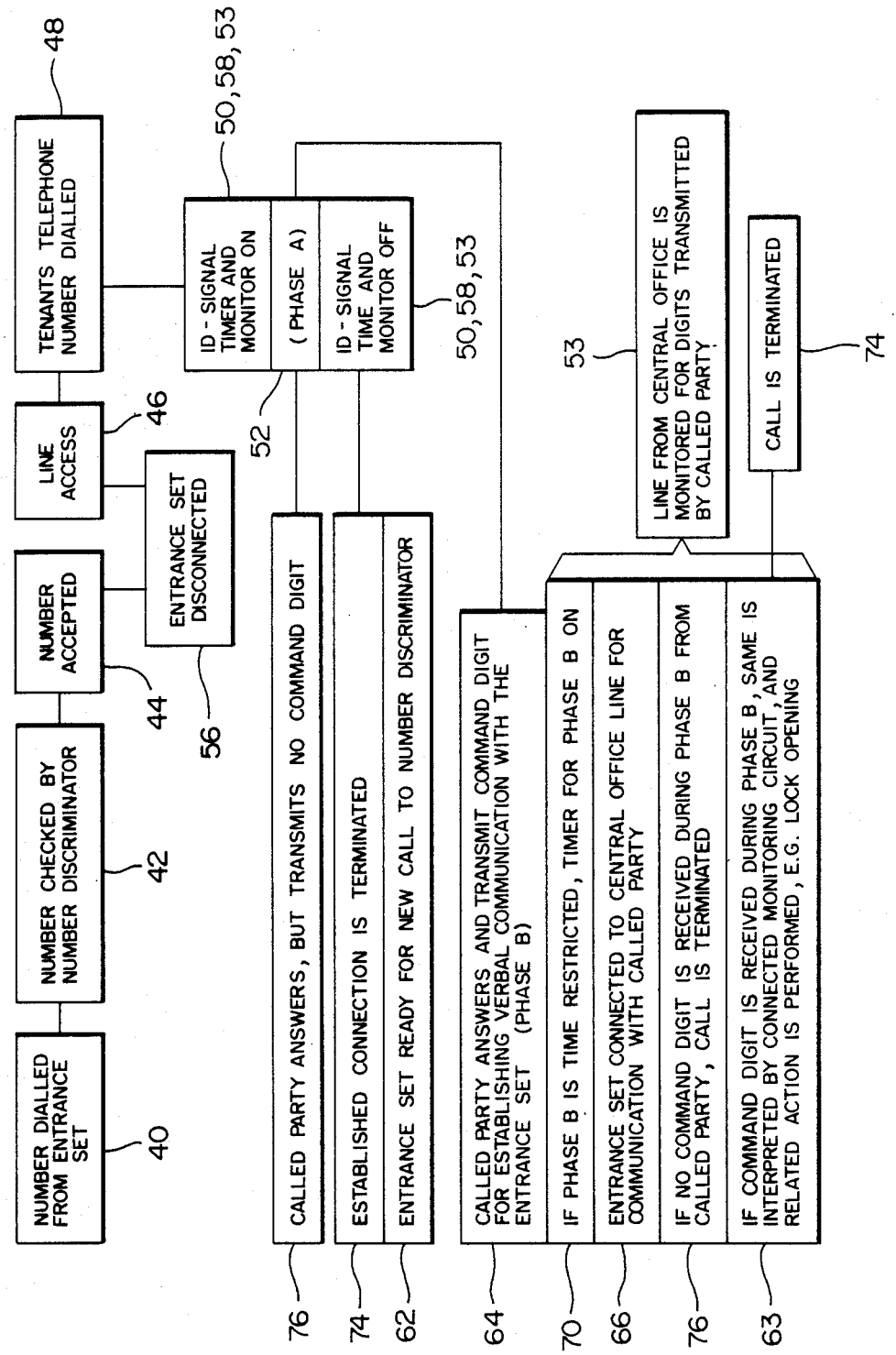

ENTRANCE TELEPHONE SYSTEM UTILIZING THE PUBLIC SUBSCRIBER TELEPHONE NETWORK

CROSS REFERENCE TO RELATED APPLICATION(S)

This is a continuation of application Ser. No. 030,865, filed as PCT SE86/00313 on Jun. 26, 1986, published as WO87/00378 on Jan. 15, 1987, now abandoned. This U.S. application stems from PCT International Application No. PCT/SE86/00313 filed June 26, 1986.

BACKGROUND OF THE INVENTION

1. Field of the Invention

The present invention relates to an improved entrance telephone system of the type utilizing the public subscriber telephone network for signalling, communication and door opening control purposes.

2. Related Prior Art

Such installations are previously known, e.g. from U.S. Pat. No. 3,947,641, in which patent it is disclosed to discriminate subscriber numbers dialled from a conventional telephone set, for example located adjacent to a locked entrance door, thus facilitating establishment of a specific and reciprocal communication between entrance/tenant, and it is further possible for the "entrance set" to receive and interpret a signal generated by the "reply set" as a specific opening command transmitted over the communication circuit established by means of telephone number discrimination. There are various types of installations utilizing this basic principle, for example installations marketed under the trade mark "Telecode" in Sweden, and installation marketed under the trade mark "Entraguard" in the U.S.A., which serve as proof of functionability and usability for these types of installations. Since the established communication originates from the entrance telephone set, having a number filter (hereinafter referred to as number discriminator) which includes the called telephone number and also initiating the call, the called tenant can, when lifting the hand set (B-reply) (i.e., "off-hook"), be informed of the fact that the call originates from the entrance telephone set, while the visitor, who originated the call, may not be made aware of the reply, which makes it possible for the tenant to secretly decide whether or not speech communication should be established with the visitor. In the above mentioned and previously known systems, this is accomplished in such a way, that the entrance set, after having obtained confirmation of B-reply, transmits an identification signal via the public telephone network. This signal is common for all entrance sets, but becomes specific for each calling entrance set. The parts with which a visitor can communicate, i.e. number selecting device and communication unit for speech communication, and any video communication unit, are disconnected when number selection at the entrance has been completed and accepted, and it is the number discriminator, in practical design arranged as a central processor, to which the aforementioned communication units, as well as the telephone network and the entrance lock, can be regarded as peripherally connected, and which provides the actual number selecting procedure to the central office and monitors the network for B-reply indication within predetermined calling time period (approximately 0.5 minute). When and if B-reply is indicated, transmission of an ID-signal (identification signal) commences to the telephone network (from the replying tenant), and a time logic circuit is also connected, which during a time period of approximately 5 seconds monitors any change on the telephone network. Provided that no such change is indicated, the units facilitating communication for a visitor are connected to the already established circuit via the public telephone network, and the visitor is made aware that a reply has been made, and can verbally communicate with the tenant and request unlocking of the entrance door. An entrance call, which can also be utilized for door opening purposes, has thus been established. However, should a change in the telephone network be indicated during the previously mentioned surveillance period (replaced hand set=inverted B-reply, i.e., "on-hook"), said units are not connected, and the circuit established via the public telephone network is disconnected, without the visitor obtaining any knowledge of the fact that a reply has taken place. The visitor is given the impression, that the tenant has not replied. The tenant has thus a possibility, during the time period when the ID-signal is sounded, to secretly make a desired decision whether or not an entrance call should be answered, by deciding between holding the hand set lifted, or by replacing the hand set on the telephone set.

To obtain the above function, it must be possible for the number discriminator to automatically indicate circuit status with regard to B-reply and replaced hand set, i.e. the public telephone network used must be able to provide and transmit such information. However, this is the case substantially only in the countries already mentioned with regard to existing installations, i.e. Sweden and the U.S.A., whereas a change of polarity takes place in Sweden for B-reply and replaced hand set, while in the U.S.A. other methods may be used for these functions, e.g. variations of voltage. Such changes can be detected by the number discriminator, but in other countries, for example Norway, France and the Federal Republic of Germany, there are no such detectable signals. As a result, the above mentioned concept can only be used in countries where it is already being used, but in other countries, the called party can not secretly decide whether or not an entrance call should be switched through, and such calls are thus forced on the called party, which is a disadvantage both with regard to privacy and security.

SUMMARY OF THE INVENTION

The object of the present invention is to disclose a device facilitating total control for the called party, also with regard to public telephone networks in which B-reply and replaced hand set are not indicated automatically. Such a concept will obviously also operate with regard to line status indicating telephone networks such as the Swedish and U.S. telephone networks, i.e. one solution only can be universally used for all automatic public telephone networks, only adapted to prescribed galvanic and technical specifications for the specific telephone network used.

The present invention relates to an entrance telephone installation arranged to be connected to a public telephone network, said installation including a number discriminator with line access and dialling possibility, addressable from an entrance telephone set for connecting a circuit to specific reply sets, which reply sets are arranged to facilitate signalling via the switched through circuit in the telephone network to facilitate door lock opening, and it is mainly characterised in that a specific ID-signal is sent to the telephone network during a first time period after completed switching operation to a specific reply set during a first predetermined period of time, and that the telephone network is monitored simultaneously with regard to digits entered from the reply set and transmitted via the telephone network as a pulsed signal, multi frequency signal or optical signal, non-entering of digits at the reply set during said first time period resulting in disconnection of the established circuit, whereas detection of one or a number of predetermined digits entered from the reply set during the first time period is interpretated as specific commands, which result in specific actions, as for example establishment of video and/or speech communication with the entrance set, blocking action preventing repeated calls during a specific time period, immediate disconnection, alarm transmission from the entrance set, or any other predetermined function.

As further characteristic features for the entrance telephone installation according to the invention it can be mentioned, that the first time period is followed by a second time period, provided that a predermined digit entering operation is performed during the first time period, during which video and/or speech communication can be performed between the reply set and the entrance set, and that digits dialled from the reply set during said second time period are detected and interpretated as specific commands, which with regard to a resulting function for one or a number of signals results in a different resulting function in relation to corresponding signal(s) during the first time period.

Examples of embodiments according to the present invention are more fully described below, and an example of a previously known entrance telephone installation, to which described embodiments can be applied, is shown in U.S. Pat. No. 3,947,641.

BRIEF DESCRIPTION OF THE DRAWINGS

FIGS. 2 and 3 are respectively an operation sequence diagram and a flow chart illustrating the operation of an exemplary entrance telephone system according to the present invention.

DESCRIPTION OF THE PREFERRED EMBODIMENT

Figure 1:
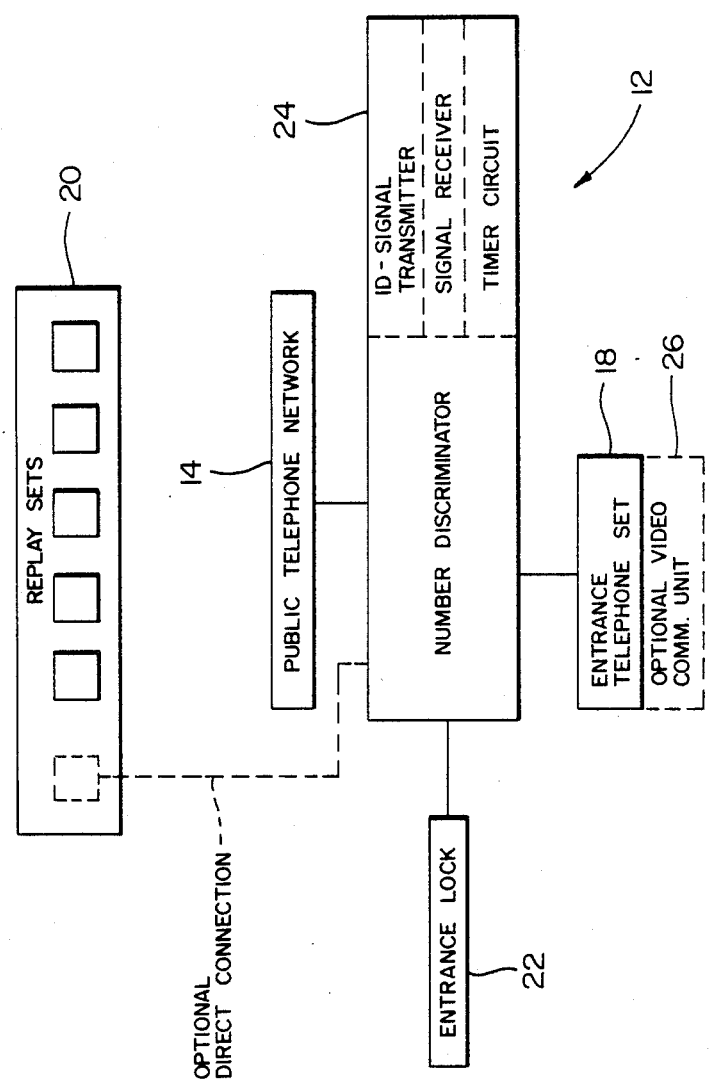
FIG. 1 is a block diagram of an exemplary entrance telephone system according to the present invention.

Referring to FIG. 1, the present invention relates to an entrance telephone installation 12 arranged to be connected to a public telephone network 14, said installation including a number discriminator 16 with line access and dialing possibility, addressable from an entrance telephone set 18 for connecting a circuit to specific reply sets 20, which are arranged to facilitate signalling via the switched through circuit in the telephone network 14 to facilitate door entrance lock 22 opening, and it is mainly characterized in that a specific ID-signal is sent to the telephone network by circuit 24 during a first time period after completed switching operation to a specific reply set 20 during a first predetermined period of time, and that the telephone network 14 is monitored simultaneously with regard to digits entered from the reply set 20 and transmitted via the telephone network 14 as pulsed signal, multi frequency signal or optical signal, non-entering of digits at the reply set 20 during said first time period resulting in disconnection of the established circuit, whereas detection of one or a number of predetermined digits entered from the reply set 20 during the first time period is interpreted as specific commands, which results in specific actions, as, for example, establishment of video and/or speech communication 26 with the entrance set 18, blocking action preventing repeated calls during a specific time period, immediate disconnection, alarm transmission from the entrance set, or any other predetermined function.

According to the present invention, the number discriminator 16 is arranged not to be influenced or to monitor for automatic indications for line status from the telephone network 14, but instead to sense and be influenced by active signals from the called tenant, and these signals are used also for other purposes than only, as previously, entrance door lock 22 opening control. Communication between entrance set/reply set 20 is still performed completely specifically by the initial number discrimination, and the established communication circuit facilitates specific responses to other signals than a predetermined opening command, particularly since the communication units accessable by a visitor are disconnected when a command signal is received. The signals can be of various types, provided that their meaning and interpretation have been previously decided. In existing installations today, an opening command consists of a digit selected and entered at the reply set, e.g. the digit "5", which is transmitted as a pulsed signal or a multi frequency signal. In view of the developments made in the speech sythesis field, it is also possible to interpretate verbal messages, which are transformed into specific functions. However, also in the future, selection of a digit at the reply set, transmitted as pulses, or as more commonly as a multi frequency signal, will probably be most advantageous, and such a method will for illustrative purposes be used when describing embodiments of the invention.

Figure 2:
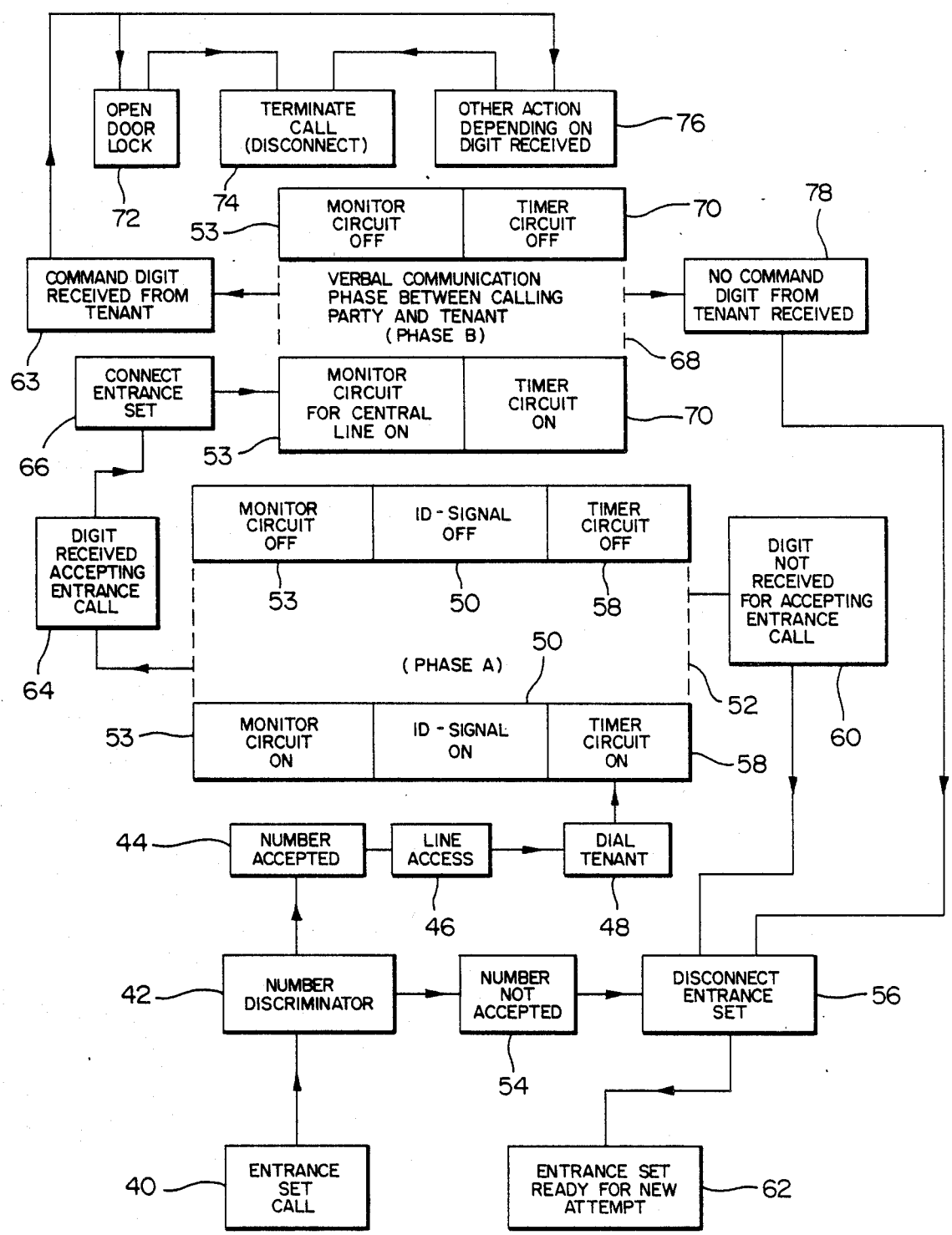

According to the present invention as illustrated in FIGS. 2 and 3, an approved address sequence corresponding to a tenant dialed from an entrance set by a visitor at block 40 results in that the number discriminator dials the corresponding telephone number via the main exchange at blocks 42–48. As previously mentioned, B-reply can in many public telephone networks not be indicated, due to the insufficiency of the network. In order to overcome this situation, a completed dialling sequence resulting in the establishment of a call, and without awaiting B-reply, results in transmission of an ID-signal at block 50 to the telephone network, which ID-signal may comprise a tone signal, a verbal message or similar signal. Also so called "code ringing" may, in networks facilitating same, be used to differentiate an entrance call during the calling sequence, as an addition to the ID-signal. Said signal is transmitted during a first phase (phase A=the calling phase block 52) for a predetermined time period, e.g. 0.5 minute. During this phase, all communication units accessable by the visitor are disconnected, and at the same time the number discriminator monitors the telephone network in phases A and B at section 53 as follows:

(a) If no event is indicated on the line circuit during the stipulated period of time, the connection to the telephone network is interrupted or disconnected at blocks 54–56. A situation type "no response" has been established, which in a suitable manner is communicated to the visitor at the entrance. It should be noted, that for the telephone networks already discussed, B-reply (lifted hand set) does not result in any automatically indicated event on the network circuit. In B-reply indicating telephone networks, it is possible, if desired, to add the period of time elapsed of phase A (sections 58) before a B-reply is indicated to the remaining period of phase A, i.e. that a time period corresponding to the total time period for phase A is counted down from the moment when B-reply is indicated. If the called party does not take any action, or replaces the hand set, the number discriminator interpretates this as "no reply" at block 60, and the visitor, whose communication units are disconnected at block 56, receives the same information after expiration of phase A, when the connection established via the public telephone network also is disconnected. The entrance set is thereafter in its inactive phase, and ready for new addressing operations at block 62.

(b) If B-reply is obtained during the time period described as phase A, the called party can choose to accept the call at block 64. During this time period, the called party can transmit a specific command, for example by entering the digit "5" at the reply set, from which same is transmitted as a pulsed or a multi frequency signal. This signal is transmitted via the established telephone, circuit to the number discriminator, and when same is detected at block 63, the visitor's communication units are connected to the telephone line at block 66, the ID-signal is interrupted, and a phase (the communication phase=phase B) can commence at block 68. Also this phase is preferably time restricted, e.g. in the range 0.5 minute, (sections 70) and during this period speech communication and door opening can be performed. By giving the same or other specific command, e.g. the digit "9", during the communication phase, the entrance door lock is opened and the connection disconnected (blocks 72 and 74).

The above basic example indicates how previously known types of entrance telephone installations connected to public telephone networks also can be used when the telephone network lacks automatic indication of so called B-reply, and how the same type of installation also can be connected to a public telephone network having automatic indication of B-reply.

Also other facilities are offered, for example use of further specific commands as illustrated at block 76. Since the number discriminator during the entire time period denominated phase A monitors the network for specific commands, a called party may thus by entering for example the digit "0" during this initial phase block the number discriminator against repeated calls during a certain period of time, e.g. 15-30 minutes. Such a possibility is often desirable when harassed by repeated calls from unathorized persons, and results in that addressing operations of this specific telephone number are not switched through, and that only "no reply" is indicated at the entrance during this time period.

This function can be further modified, e.g. by completing the aforementioned command within a short period of time, e.g. 1-2 seconds, with a further entered digit, e.g. "3". If no such further command is received at block 78, the basic function described above is performed. Entering such a further and additional digit can be used to indicate how many hours, or parts thereof, the specific reply set shall be blocked against incoming calls from the entrance set.

Obviously other commands with other meaning can also be sent from the reply set during the time period denominated phase A, and result in various types of response, and as an example it can be mentioned that the entrance set can be connected to transmit an alarm signal by such an additional command.

When phase B commences, i.e. when the called party as previously described enters the digit "5" to facilitate speech communication with the entrance set, specific signals can also be transmitted from the reply set to the entrance set, a fact previously used only for door opening purposes. Correspondingly to what has previously been described, alternative commands can also be given during phase B, resulting in various types of response, and since a new phase has commenced, different from the previous phase A, also the signals used during phase A can be utilized, but with a completely different response. The digits previously mentioned with regard to phase B, i.e. "5" or "9", can thus during phase B be utilized to accomplish door opening, whereas the digits previously mentioned with reference to phase A can be given new functions. During the time period of phase B, a replaced hand set may for example result in disconnection of the established call after expiration of the time period referred to as phase B, without door opening taking place, and the entrance set is thereafter immediately ready to accept addressing. If, for example, the digit "0" is entered during said time period, immediate disconnection of the call can be performed, without a door opening operation, and the entrance set may also be blocked for addressing the last dialled number during a shorter period of time, e.g. 2 minutes. Use of the digit "3", or other digit, including digits used for commands during phase A, can give other type of response, e.g. a further extended blocking period, alarm transmission from the entrance set, or other type of action.

The entrance set is advantageously addressed by means of a key pad, e.g. having 12 keys, by means of which a code lock function in a previously known why may be integrated, facilitating door opening by programming of a specific lock code. The "cross-symbol key" can for example be arranged to be continously addressable to the number discriminator during the various phases of communication for the entrance set, and when addressed in this fashion, arranged to immediately interpret the following code entered, e.g. opening code, and if correctly received, open the entrance lock, and thereafter return to the previously existing call situation. This facilitates a possibility for a tenant to get access, even during the time when a visitor is in the process of making a call or is communicating with a tenant in the building.

It has previously been indicated, that signals from the reply set are transmitted as pulsed or multi frequency signals. Signalling may also be performed in other fashions, e.g. via fibreoptical cables, and with signal types adapted for such cables. Such cables are today becoming more frequently used for telecommunication purposes, and the present invention can obviously also be used in conjunction with such networks.

The method in which the number discriminator performs surveillance, sensing and identification of signals from the reply set, and performs actions associated with received commands, can today be solved in a number of different ways, and with use of commercially available components, and in detail described embodiments are thus not believed necessary. Sensing of pulsed signals may in its simpliest form be performed using conventional relay techniques, but also counters, such as integrated circuits, may be utilized. Sensing of signals of multi frequency type is performed in a previously known way using filtering circuits, and the signals obtained can thereafter in a known fashion be arranged to control predetermined functions.

The device according to the present invention thus facilitates access to functions in public telephone networks without B-reply indication, which functions previously have been unobtainable in entrance telephone installations connected to such telephone networks, and also makes it possible to obtain further functions than what has previously been considered as possible, both with regard to telephone networks without as well as with automatic B-reply indication. An important advantage is also the fact that one and only one type of installation can be used in conjunction with all types of existing telephone networks, only being modified to meet specific connection and signalling specifications for each network.

As a further modification of the device according to the present invention can also be mentioned the possibility to adapt same to the tenant, e.g. a company, desiring a simple and rapid possibility for a visitor to enter. These types of tenants often have their own local telephone exchange (e.g., "PBX"), which can be connected directly to the number discriminator. As a result, such a tenant can be given specific and individual treatment when called, e.g. the call can be preceeded by a specific ID-signal, indicating an entrance call, immediately followed by possibility of communication between the calling party and the called party. Door opening can thereafter be performed from the reply set in previously described fashion. Hereby receives a visitor substantially immediate possibility of speech communication after having made a call, which can be most desirous for companies. It should also be mentioned, that one installation only obviously can serve more than one entrance door, i.e. a number of entrance telephone sets can be connected to be served by one number discriminator, and this common equipment can thus serve for communication and door opening purposes for a number of entrances.

I claim:

1. An entrance telephone installation adapted to be connected to a public telephone network, comprising: a number discriminator with line access to a public telephone network and a dialling ability for dialling predetermined telephone numbers over the public telephone network, said number discriminator being addressable from an entrance telephone set for establishing a circuit to specific reply sets, said reply sets being adapted to facilitate signalling via a switched through circuit in the public telephone network to facilitate door lock opening, a specific ID-signal being sent to the public telephone network during a first time period after a completed switching operation to a specific reply set during a first predetermined period of time, the public telephone network being monitored by said number discriminator simultaneously during said first time period with regard to digits entered from the reply set and transmitted via the public telephone network as a pulsed signal or multi-frequency signal, non-entering of digits at the reply set during said first time period resulting in disconnection of the established circuit, detection by the number discriminator of at least one predetermined digit entered from the reply set during the first time period being interpreted by the number discriminator as specific commands which result in the number discriminator performing at least one resultant corresponding action.

2. Entrance telephone installation according to claim 1, wherein the first time period is followed by a second time period provided that a predetermined digit entering operation is performed during the first time period, during which second time period communication can be performed between the reply set and the entrance set, particular digits dialled from the reply set during said second time period being detected and interpreted by the number discriminator as specific commands of a first type of function, said same particular digits being dialled from the reply set and being interpreted by said number discriminator during said first period as specific commands of a second type of function different than said first type of function.

3. Entrance telephone installation according to claim 1, wherein selection of a time period for blocking and preventing repeated calls to a called reply set occurs by dialing at least two digits in sequence at the reply set, performed within a predetermined period of time calculated from a first dialed digit, the digit dialed subsequently to a first digit being used to transfer information with regard to a selected blocking period.

4. Entrance telephone installation according to claim 1, wherein the entrance set is arranged with a key pad for number selection as well as programming of an entrance lock code for entrance lock opening, and one included addressable button, which when addressed, gives priority to subsequently following programmed keys which correspond to a specific lock opening code, and after having received a complete and correct code sequence cause lock opening, thereafter returning to a previously existing communication situation.

5. An entrance telephone installation according to claim 1, wherein the signalling results in actuating the door lock, thereby facilitating door opening.

6. An entrance telephone installation according to claim 1, wherein the digit entering operation may also be any type of suitable dedicated signal.

7. An entrance telephone installation according to claim 1, wherein short number selection can be utilized.

8. An entrance telephone installation according to claim 1, wherein said resultant action is establishment of video communication with the entrance set.

9. An entrance telephone installation according to claim 1, wherein said resultant action is establishment of speech communication with the entrance set.

10. An entrance telephone installation according to claim 1, wherein said resultant action is a blocking action preventing repeated calls during a specific time period.

11. An entrance telephone installation according to claim 1, wherein said resultant action is immediate disconnection.

12. An entrance telephone installation according to claim 1, wherein said resultant action is alarm transmission from the entrance set.

* * * * *